(12) United States Patent
Gil et al.

(10) Patent No.: US 8,859,162 B2
(45) Date of Patent: Oct. 14, 2014

(54) FUEL CELL MODULE

(71) Applicant: Samsung Electro-Mechanics Co., Ltd., Gyunggi-do (KR)

(72) Inventors: Jai Hyoung Gil, Gyunggi-do (KR); Kyong Bok Min, Gyunggi-do (KR); Jong Ho Chung, Gyunggi-do (KR); Jong Sik Yoon, Gyunggi-do (KR); Eon Soo Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 133 days.

(21) Appl. No.: 13/686,740

(22) Filed: Nov. 27, 2012

(65) Prior Publication Data
US 2013/0171544 A1 Jul. 4, 2013

(30) Foreign Application Priority Data
Nov. 28, 2011 (KR) ........................ 10-2011-0125307

(51) Int. Cl.
| | | |
|---|---|---|
| H01M 2/08 | (2006.01) | |
| H01M 8/02 | (2006.01) | |
| H01M 8/24 | (2006.01) | |
| H01M 8/12 | (2006.01) | |

(52) U.S. Cl.
CPC .... *H01M 8/0202* (2013.01); *H01M 2008/1293* (2013.01); *H01M 8/0247* (2013.01); *Y02E 60/523* (2013.01); *Y02E 60/50* (2013.01); *H01M 8/243* (2013.01); *Y02E 60/525* (2013.01)
USPC ........... 429/508; 429/452; 429/460; 429/465; 429/466; 429/467; 429/469; 429/470; 429/471; 429/479; 429/497; 429/507

(58) Field of Classification Search
CPC ................... H01M 2008/1293; H01M 8/0202; H01M 8/0247; H01M 8/243; H01M 8/025; H01M 8/0252; H01M 8/0297; H01M 8/1006; H01M 8/245; Y02E 60/50; Y02E 60/523; Y02E 60/525
USPC ......... 429/452, 460, 465, 466, 467, 469, 470, 429/471, 479, 497, 507, 508
See application file for complete search history.

(56) References Cited

U.S. PATENT DOCUMENTS

2012/0015278 A1 * 1/2012 Yoon et al. ................... 429/466

FOREIGN PATENT DOCUMENTS

KR 1020110085848 7/2011

* cited by examiner

*Primary Examiner* — Patrick Ryan
*Assistant Examiner* — Ben Lewis
(74) *Attorney, Agent, or Firm* — Ladas & Parry, LLP (57) ABSTRACT

Disclosed herein is a fuel cell module. The fuel cell module according to preferred embodiments of the present invention includes: a first support part including a first body part surrounding one side of an outer peripheral surface of a fuel cell and a first connection part formed on one side of the first body part in a longitudinal direction; a second support part including a second body part surrounding the other side of the outer peripheral surface of the fuel cell and the second connection part formed on one side of the second body part in a longitudinal direction; and a fixing part passing through the first connection part and the second connection part to connect and fix the first connection part and the second connection part to each other.

18 Claims, 7 Drawing Sheets

FUEL CELL MODULE

CROSS REFERENCE TO RELATED APPLICATION

This application claims the benefit of Korean Patent Application No. 10-2011-0125307, filed on Nov. 28, 2011, entitled "Fuel Cell Module", which is hereby incorporated by reference in its entirety into this application.

BACKGROUND OF THE INVENTION

1. Technical Field

The present invention relates to a fuel cell module.

2. Description of the Related Art

The fuel cell is an apparatus that directly converts chemical energy of fuel (hydrogen, LNG, LPG, or the like) and air (oxygen) into electricity and heat by an electrochemical reaction. The power generation technologies according to the prior art need to perform processes such as fuel combustion, vapor generation, turbine driving, generator driving, or the like. On the other hand, the fuel cell is a new conceptual power generation technology that does not induce environmental problems while increasing efficiency. The fuel cell little emits air pollutants such as SOx, NOx, or the like, can achieve pollution-free power generation due to the reduced generation of carbon dioxide, and can achieve low noise, non-vibration, or the like.

As the fuel cell, there are various types of fuel cells such as a phosphoric acid fuel cell (PAFC), an alkaline fuel cell (AFC), a polymer electrolyte type fuel cell (PEMFC), a direct methanol fuel cell, a solid oxide fuel cell (SOFC), or the like. Among others, the solid oxide fuel cell (SOFC) can implement high-efficiency generation, can implement, complex generation such as coal gas-fuel cell-gas turbine, or the like, and has various generation capacity and as a result, is appropriate for a small generator, a large generator, or a distributed power supply. Therefore, the solid oxide fuel cell is an essential generation technology for entering hydrogen economy society in future.

The prior art collects current by forming metal lines on the outside of a collector collecting current generated from the fuel cell (Korean Patent Laid-Open Publication No. 2011-0085848). However, in this structure, as a size of a cell is increased, the number of expensive metal lines is increased, which leads to increase manufacturing costs and make a structure complicated. As a result, it is difficult to mass-produce the solid oxide fuel cell.

SUMMARY OF THE INVENTION

The present invention has been made in an effort to provide a fuel cell module having a fuel cell easily inserted thereinto.

Further, the present invention has been made in an effort to provide a fuel cell module capable of improving current collector capacity by maximizing a contact area with a fuel cell.

In addition, the present invention has been made in an effort to provide a fuel cell module capable of improving durability by facilitating oxidation-resistance coating.

According to a preferred embodiment of the present invention, there is provided a fuel cell module, including: a first support part including a first body part surrounding one side of an outer peripheral surface of a fuel cell and a first connection part formed on one side of the first body part in a longitudinal direction; a second support part including a second body part surrounding the other side of the outer peripheral surface of the fuel cell and the second connection part formed on one side of the second body part in a longitudinal direction; and a fixing part passing through the first connection part and the second connection part to connect and fix the first connection part and the second connection part to each other.

The first body part may include: a first inner surface contacting and surrounding an outer peripheral surface of the fuel cell and including a first air supplying hole through which air passes; and a first outer surface spaced apart from the first inner surface at a predetermined distance so as to surround the first inner surface and connected with both sides of the first inner surface in a longitudinal direction, wherein a first air passage that is a space formed by being spaced apart from the first outer surface is connected with the first air supplying hole.

The first outer surface may be formed to have rigidity stronger than that of the first inner surface.

The thickness of the first outer surface may be formed to be thicker than that of the first inner surface.

The first inner surface and the first outer surface may be made of an alloy of stainless steel.

The second body part may include: a second inner surface contacting and surrounding an outer peripheral surface of the fuel cell and including a second air supplying hole through which air passes; and a second outer surface spaced apart from the second inner surface at a predetermined distance so as to surround the second inner surface and connected with both sides of the second inner surface in a longitudinal direction, wherein a second air passage that is a space formed by being spaced apart from the second outer surface at a predetermined distance is connected with the second air supplying hole.

The second outer surface may be formed to have rigidity stronger than that of the second inner surface.

The thickness of the second outer surface may be formed to be thicker than that of the second inner surface.

The second inner surface and the second outer surface may be made of an alloy of stainless steel.

The first connection part may be protruded from one side of the first body part and provided with a plurality of first through holes formed in one side of the first body part in a longitudinal direction and having a form penetrating through a center thereof in the longitudinal direction.

The second connection part may be protruded from one side of the second body part and provided with a plurality of second through holes formed in one side of the second body part in a longitudinal direction and having a form penetrating through a center thereof in the longitudinal direction.

According to another preferred embodiment of the present invention, there is provided a fuel cell module, including: an inner surface contacting and surrounding an outer peripheral surface of a fuel cell and including an air supplying hole through which air passes; a first outer surface surrounding a part of the inner surface while being spaced apart from the inner surface at a predetermined distance and having one side thereof connected with one side of the inner surface in a longitudinal direction; a second outer surface surrounding a part of the inner surface while being spaced apart from the inner surface at a predetermined distance and having the other side thereof connected with the other side of the inner surface in a longitudinal direction; and a fixing part inserted into the other side of the first outer surface and one side of the second outer surface.

The first outer surface and the second outer surface may be formed to have rigidity stronger than the inner surface.

The thickness of the first outer surface and the second outer surface may be formed to be thicker than that of the inner surface.

The first outer surface, the second outer surface, the inner surface, and the outer surface may be made of an alloy of stainless steel.

The other side of the first outer surface and one side of the second outer surface may be provided with a plurality of insertion holes formed in a longitudinal direction.

One surface of the fixing part may be provided with a first control bar protruded corresponding to the insertion holes of the first outer surface and the second outer surface and inserted into the insertion holes.

One surface of the fixing part may be provided with a second control bar protruded corresponding to the insertion holes of the first outer surface and the second outer surface and inserted into the insertion holes and formed so as to be spaced apart from the first control bar to the outside at a predetermined distance.

DESCRIPTION OF THE PREFERRED EMBODIMENTS

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from preferred embodiments and the following detailed description taken in conjunction with the accompanying drawings. In the specification, in adding reference numerals to components throughout the drawings, it is to be noted that like reference numerals designate like components even though components are shown in different drawings.

Further, when it is determined that the detailed description of the known art related to the present invention may obscure the gist of the present invention, the detailed description thereof will be omitted. In the description, the terms "first", "second", and so on are used to distinguish one element from another element, and the elements are not defined by the above terms.

Hereinafter, a fuel cell module according to preferred embodiments of the present invention will be described in detail with reference to the accompanying drawings.

Figure 1:
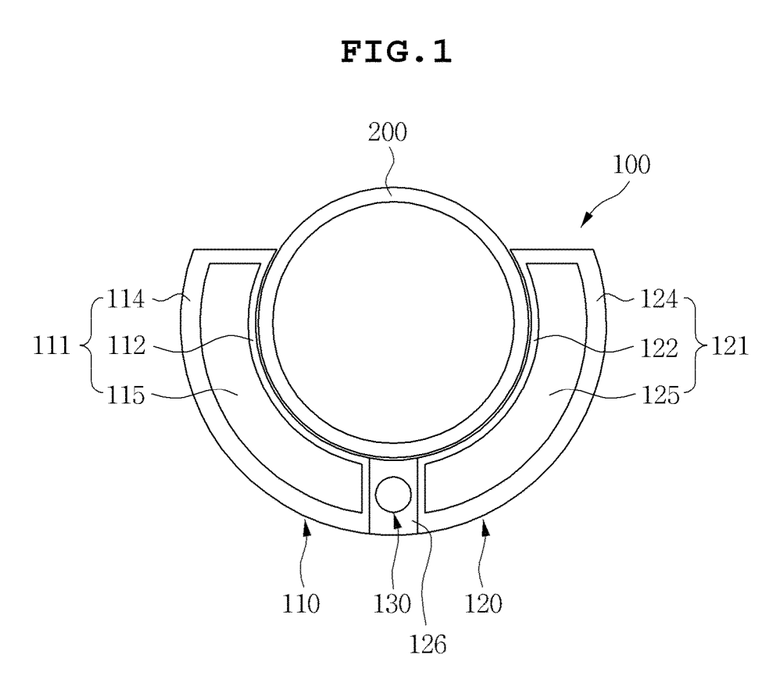
FIG. 1 is an exemplified diagram showing a fuel cell module according to a preferred embodiment of the present invention in which a fuel cell is mounted.

FIG. 1 is an exemplified diagram showing a fuel cell module according to a preferred embodiment of the present invention in which a fuel cell is mounted.

A fuel cell module 100 is an apparatus that collects electric energy generated during a generation process of a fuel cell 200. Referring to FIG. 1, the fuel cell module 100 may include a first support part 110, a second support part 120, and a fixing part 130.

The first support part 110 may include a first body part 111 surrounding one side of an outer peripheral surface of the fuel cell 200 and a first connection part (not shown) formed on one side of the first body part 111 in a longitudinal direction.

The first body part 111 may include a first inner surface 112, a first outer surface 114, and a first air passage 115.

The first inner surface 112 is formed to surround the fuel cell 200 by directly contacting the outer peripheral surface of the fuel cell 200. The first inner surface 112 may be formed in a curved surface so as to correspond to the outer peripheral surface of the fuel cell 200. Further, the first inner surface 112 may be made of flexible metals. For example, the first inner surface 112 may be made of an alloy of thin stainless steel. That is, the first inner surface 112 may be made of stainless steel but may be thinly formed to have flexible properties. As such, the first inner surface 112 is a curved surface corresponding to the fuel cell 200 and may be made of flexible metals, such that the contact area of the fuel cell 200 is expanded as maximally as possible, thereby maximizing the current collector efficiency.

The first outer surface 114 may be formed to surround the first inner surface 112 while being spaced apart from the first inner surface 112 at a predetermined distance. Both sides of the first outer surface 114 in a longitudinal direction may each be connected to both sides of the first inner surface 112 in a longitudinal direction. The first outer surface 114 may be made of rigid metals. For example, the first outer surface 114 may be made of an alloy of thick stainless steel. That is, the first outer surface 114 may be made of stainless steel but, may be thickly formed to have rigid properties. As such, the first outer surface 114 may be made of rigid metals to support the first inner surface 112 on which the fuel cell 200 is mounted.

The first air passage 115 is a space formed by spacing the first inner surface 112 and the first outer surface 114 from each other at a predetermined distance. Air to be supplied to the fuel cell 200 passes through the first air passage 115.

The first connection part (not shown) may be formed on one side of the first body part 111 in a longitudinal direction. That is, the first connection part (not shown) may be formed to be protruded to one of both sides on which the first inner surface 112 is connected with the first outer surface 114. The first connection part (not shown) is to fasten the first support part 110 and the second support part 120 to each other and the fixing part 130 may be inserted therebetween. In FIG. 1, the first connection part (not shown) is not shown according to the overlapping with a second connection part 126 of the second support part 120.

The second support part 120 may include a second body part 121 surrounding the other side of an outer peripheral surface of the fuel cell 200 and a second connection part 126 formed on one side of the second body part 121 in a longitudinal direction.

The second body part 121 may include a second inner surface 122, a second outer surface 124, and a second air passage 125.

The second inner surface 122 is formed to surround the fuel cell 200 by directly contacting the outer peripheral surface of the fuel cell 200. The second inner surface 122 may be formed in a curved surface so as to correspond to the outer peripheral surface of the fuel cell 200. Further, the second inner surface 122 may be made of flexible metals. For example, the second inner surface 122 may be made of an alloy of thin stainless steel. As such, the second inner surface 122 is a curved surface corresponding to the fuel cell 200 and may be made of flexible metals, such that the contact area of the fuel cell 200 is expanded as maximally as possible, thereby maximizing the current collector efficiency.

The second outer surface 124 may be formed to surround the second inner surface 122 while being spaced apart from the second inner surface 122 at a predetermined distance. Both sides of the second outer surface 124 in a longitudinal direction may each be connected to both sides of the second inner surface 122 in a longitudinal direction. The second outer surface 124 may be made of rigid metals. For example, the second outer surface 124 may be made of thick stainless steel. As such, the second outer surface 124 may be made of rigid metals to support the second inner surface 122 on which the fuel cell 200 is mounted.

The second air passage 125 is a space formed by spacing the second inner surface 122 and the second outer surface 124 from each other at a predetermined distance. Air to be supplied to the fuel cell 200 passes through the second air passage 125.

The second connection part 126 may be formed on one side of the second body part 121 in a longitudinal direction. That is, the second connection part 126 may be formed to be protruded to one of both sides on which the second inner surface 122 is connected with the second outer surface 124. The second connection part 126, which fastens the first support part 110 and the second support part 120 to each other, may be inserted with the fixing part 130.

The fixing part 130 is a member for fastening the first support part 110 and the second support part 120 to each other. The fixing part 130 may be inserted into the connection part in the state in which the first connection part (not shown) of the first support part 110 and the second connection part 126 of the second support part 120 are connected with each other. As such, the fixing part 130 is inserted in the state in which the first support part 110 is connected with the second support part 120, such that the first support part 110 and the second support part 130 may be fixed in the state in which the fuel cell 200 is mounted.

The aforementioned fuel cell module 100 may be formed in a form in which the first support part 110, the second support part 120, and the fixing part 130 surround the fuel cell 200.

Figure 2:
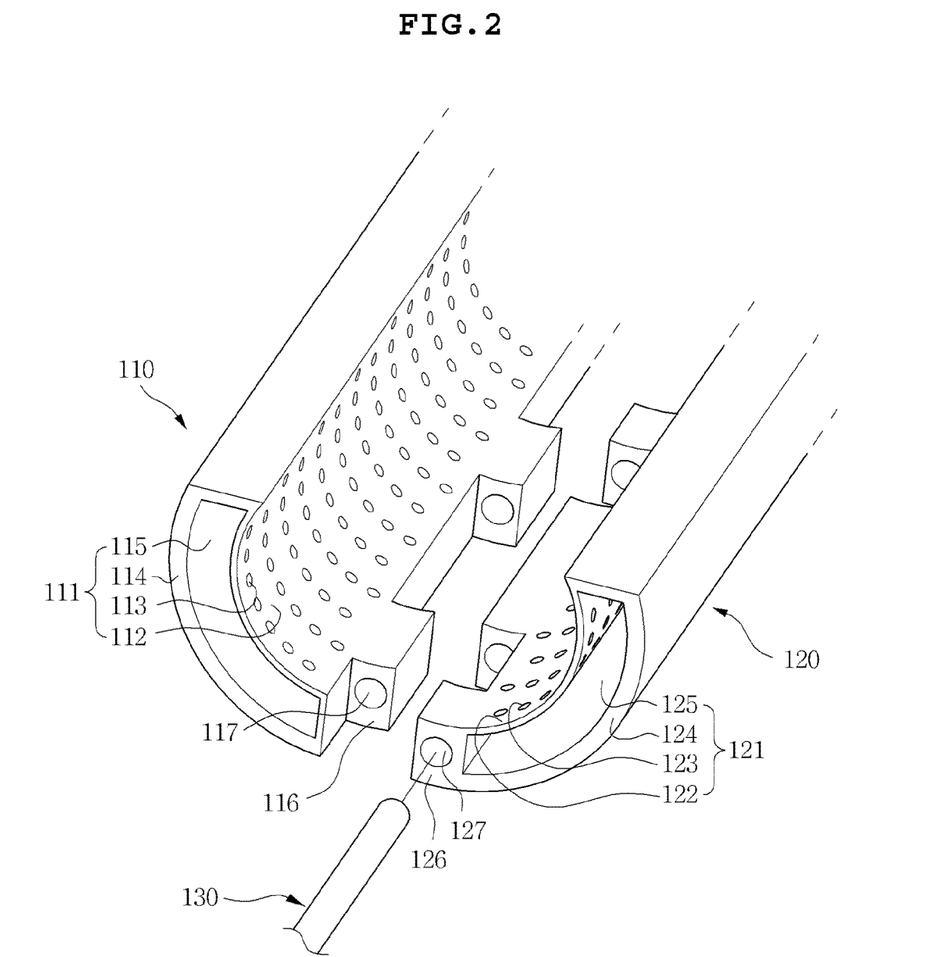
FIG. 2 is an exemplified diagram showing a fuel cell module according to the preferred embodiment of the present invention.

FIG. 2 is an exemplified diagram showing the fuel cell module according to the preferred embodiment of the present invention.

Referring to FIG. 2, the fuel cell module 100 may include the first support part 110, the second support part 120, and the fixing part 130.

The first support part 110 may include the first body part 111 and a first connection part 116.

The first body part 111 may include a first inner surface 112, a first outer surface 114, a first air passage 115, and a first air supplying hole 113.

The first inner surface 112 is formed to surround the fuel cell (not shown) by directly contacting the outer peripheral surface of the fuel cell (not shown). The first inner surface 112 may be formed in a curved surface so as to correspond to the outer peripheral surface of the fuel cell (not shown). Further, the first inner surface 112 may be made of flexible metals. For example, the first inner surface 112 may be made of thin stainless steel. That is, the first inner surface 112 may be made of stainless steel but may be thinly formed to have flexible properties. As such, the first inner surface 112 is a curved surface corresponding to the fuel cell (not shown) and may be made of flexible metals, such that the contact area of the fuel cell (not shown) is expanded as maximally as possible, thereby maximizing the current collector efficiency. In addition, the first inner surface 112 may be formed with the first air supplying hole 113 for supplying air to the fuel cell (not shown).

The first outer surface 114 may be formed to surround the first inner surface 112 while being spaced apart from the first inner surface 112 at a predetermined distance. Both sides of the first outer surface 114 in a longitudinal direction may each be connected to both sides of the first inner surface 112 in a longitudinal direction. The first outer surface 114 may be made of rigid metals. For example, the first outer surface 114 may be made of thick stainless steel. That is, the first outer surface 114 may be made of stainless steel but may be thickly formed to have rigid properties. As such, the first outer surface 114 may be made of rigid metals to support the first inner surface 112 on which the fuel cell (not shown) is mounted.

The first air passage 115 is a space formed by spacing the first inner surface 112 and the first outer surface 114 from each other at a predetermined distance. The first air passage 115 may be connected with the first air supplying hole 113 of the first inner surface 112.

The plurality of first air supplying holes 113 may be formed on the first inner surface 112. The first air passage 115 may be connected to the inside of the fuel cell module 100, in which the fuel cell (not shown) is mounted, by the first air supplying hole 113. That is, the air passing through the first air passage 115 may be supplied to the fuel cell (not shown) mounted in the fuel cell module 110 by the first air supplying hole 113.

The first connection part 116 may be formed on one side of the first body part 111 in a longitudinal direction. That is, the first connection part 116 may be formed to be protruded to one of both sides on which the first inner surface 112 is connected with the first outer surface 114. The first connection part 116 is to fasten the first support part 110 and the second support part 120 to each other. The first connection part 116 may include a first through hole 117 into which the fixing part 130 for fastening the first support part 110 and the second support part 120 to each other is inserted.

The first through hole 117 may be formed at the center of the first connection part 116 so as to longitudinally penetrate therethrough.

The second support part 120 may include the second body part 121 surrounding the other side of the outer peripheral surface of the fuel cell (not shown) and the second connection part 126 formed on one side of the second body part 121 in the longitudinal direction.

The second body part 121 may include the second inner surface 122, the second outer surface 124, and the second air passage 125.

The second inner surface 122 is formed to surround the fuel cell (not shown) by directly contacting the outer peripheral surface of the fuel cell (not shown). The second inner surface 122 may be formed in a curved surface so as to correspond to the outer peripheral surface of the fuel cell (not shown). Further, the second inner surface 122 may be made of flexible metals. For example, the second inner surface 122 may be made of thin stainless steel. That is, the second inner surface 122 is made of stainless steel but may be thinly formed to have flexible properties. As such, the second inner surface 122 is a curved surface corresponding to the fuel cell (not shown) and is made of flexible metals, such that the contact area of the fuel cell (not shown) is expanded as maximally as possible, thereby maximizing the current collector efficiency. In addition, the second inner surface 122 may be formed with the second air supplying hole 123 for supplying air to the fuel cell (not shown).

The second outer surface 124 may be formed to surround the second inner surface 122 while being spaced apart from the second inner surface 122 at a predetermined distance. Both sides of the second outer surface 124 in a longitudinal direction may each be connected to both sides of the second inner surface 122 in a longitudinal direction. The second outer surface 124 may be made of rigid metals. For example, the second outer surface 124 may be formed of thick stainless steel. That is, the second outer surface 124 is made of stainless steel but may be thickly formed to have rigid properties. As such, the second outer surface 124 may be made of rigid metals to support the second inner surface 122 on which the fuel cell (not shown) is mounted.

The second air passage 125 is a space formed by spacing the second inner surface 122 and the second outer surface 124 from each other at a predetermined distance. The second air passage 125 may be connected with the second air supplying hole 123 of the second inner surface 122.

The plurality of second air supplying holes 123 may be formed on the first inner surface 122. The second air passage 125 may be connected to the inside of the fuel cell module 100, in which the fuel cell (not shown) is mounted, by the second air supplying hole 123. That is, the air passing through the second air passage 125 may be supplied to the fuel cell (not shown) mounted in the fuel cell module 110 by the second air supplying hole 123.

The second connection part 126 may be formed on one side of the second body part 121 in a longitudinal direction. That is, the second connection part 126 may be formed to be protruded to one of both sides on which the second inner surface 122 is connected with the second outer surface 124. The second connection part 126 is to fasten the first support part 110 and the second support part 120 to each other. The second connection part 126 may include a second through hole 127 into which the fixing part 130 for fastening the first support part 110 and the second support part 120 to each other is inserted.

The second through hole 127 may be formed at the center of the second connection part 126 so as to longitudinally penetrate therethrough.

The fixing part 130 is a member for fastening the first support part 110 and the second support part 120 to each other. The fixing part 130 may be inserted in the state in which the first connection part 116 of the first support part 110 and the second connection part 126 of the second support part 120 are connected with each other. That is, as the first connection part 116 and the second connection part 126 are connected with each other, the first through hole 117 of the first connection part 116 and the second through hole 127 of the second connection part 126 may overlap with each other. The first support part 110 and the second support part 120 may be fastened with each other by inserting the fixing part 130 into the first through hole 117 and the second through hole 127.

Figure 3:
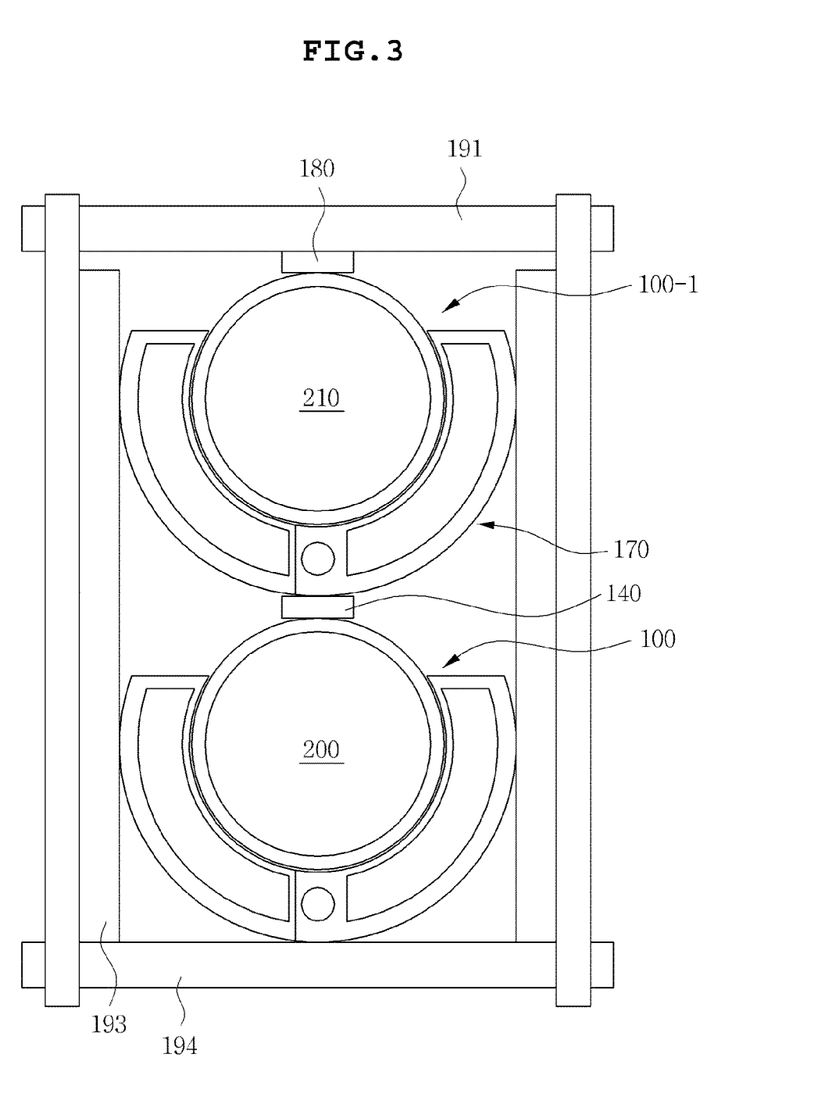
FIG. 3 is an exemplified diagram showing a multilayered fuel cell module according to the preferred embodiment of the present invention.

FIG. 3 is an exemplified diagram showing a multilayered fuel cell module according to the preferred embodiment of the present invention.

Referring to FIG. 3, a multilayered fuel cell module may be formed by alternately stacking at least two fuel cell modules 100 and 100-1 in which the fuel cells 200 and 210 are mounted. When the fuel cell modules 100 and 100-1 in which the fuel cells 200 and 210 are mounted are alternately stacked, the inner surfaces of the fuel cell modules 100 and 100-1 selectively contact the outer peripheral surfaces of the fuel cells 200 and 210 and the outer peripheral surfaces of the fuel cell modules 100 and 100-1 may contact connection members 140 and 180 and a positive current collector plate 194.

Describing an example as shown in FIG. 3, the first fuel cell module 100, the second fuel cell module 100-1, the first fuel cell 200, the second fuel cell 210, the first connection member 140, the second connection member 180, the positive current collector plate 194, and a negative current collector plate 191, and an insulating plate 193 are stacked.

The first fuel cell module 100 is mounted with the first fuel cell 200. The lower portion of the outer peripheral surface of the first fuel cell module 100 may contact the positive current collector plate 194. Further, the inner surface of the first fuel cell module 100 may contact one side of the first fuel cell 200. Here, one side of the first fuel cell 200 may be a bottom surface.

The first fuel cell 200 is mounted in the first fuel cell module 100. The bottom surface of the first fuel cell 200 may contact the first fuel cell module 100. Further, a top surface of the first fuel cell 200 may contact the first connection member 140.

The first connection member 140 is a member for transferring the negative current generated from the first fuel cell 200 to the outside of the first fuel cell 200. The first connection member 140, which is a member for current collection of the first fuel cell 200, may be made of metals having electric conductivity. One side of the first connection member 140 is connected with the first fuel cell 200. That is, one side of the first connection member 140 may be formed so as to be electrically connected to an anode support (not shown) in the first fuel cell 200. In addition, the other side of the first connection member 140 may contact the lower portion of the outer peripheral surface of the second fuel cell module 100-1.

The second fuel cell module 100 is mounted with the second fuel cell 210. The lower portion of the outer peripheral surface of the second fuel cell module 100-1 may contact the first connection member 140. The second fuel cell module 100-1 may be electrically connected with the first fuel cell 200 by contacting the first connection member 140. The inner surface of the second fuel cell module 100-1 may contact one side of the second fuel cell 210. Here, one side of the second fuel cell 210 may be a bottom surface.

The second fuel cell 210 is mounted in the second fuel cell module 100-1. The bottom surface of the second fuel cell 210 may contact the second fuel cell module 100-1. Further, the top surface of the second fuel cell 210 may contact the second connection member 180.

The second connection member 180 is a member for transferring the negative current generated from the second fuel cell 210 to the outside of the second fuel cell 210. The second connection member 180, which is a member for current collection of the second fuel cell 210, may be made of metals having electric conductivity. One side of the second connection member 180 is connected with the second fuel cell 210. That is, one side of the second connection member 180 may be formed so as to be electrically connected to an anode support (not shown) in the second fuel cell 210. In addition, the lower side of the second connection member 180 may contact the negative current collector plate 191.

The positive current collector plate 194 may collect positive current generated by the first fuel cell 200 and the second fuel cell 210.

The negative current collector plate 191 may collect negative current generated by the first fuel cell 200 and the second fuel cell 210.

The insulating plate 193 may be formed on both sides of the first fuel cell module 100 and the second fuel cell module 100-1. The insulating plate 193 is pressed to both sides of the first fuel cell module 100, such that the mounted first fuel cell 200 may better contact the first fuel cell module 100. In addition, the insulating plate 193 is pressed to both sides of the second fuel cell module 100-1, such that the mounted second fuel cell 210 may better contact the second fuel cell module 100-1.

As such, the first fuel cell 200 and the second fuel cell 210 may be disposed vertically by the first fuel cell module 100 and the second fuel cell module 100-1. Further, the first fuel cell module 100 and the second fuel cell module 100-1 may collect the positive current generated from the first fuel cell 200 and the second fuel cell 210 to the positive current collector plate 194 by serially connecting the first fuel cell 200 and the second fuel cell 210 that are vertically disposed.

The preferred embodiment of the present invention describes two fuel cell modules and two fuel cells, but is only an example. Therefore, the number of fuel cell modules and fuel cells is not limited thereto. The number of fuel cell modules and fuel cells may be changed by those skilled in the art.

In addition, the preferred embodiment of the present invention describes the case in which the plurality of fuel cells is connected to one another in series by vertically disposing the plurality of fuel cell modules but is only the example. The plurality of fuel cells may be connected to one another in parallel by horizontally disposing the plurality of fuel cell modules. In addition, the plurality of fuel cells may simultaneously be connected to one another in series and in parallel by vertically and horizontally connecting the plurality of fuel cell modules to one another.

In the preferred embodiment of the present invention, a first inner surface and a second inner surface may be made of flexible metals and the first outer surface and the second outer surface may be made of rigid metals, which may be expressed in relative terms. That is, a meaning that metals forming the first inner surface and the second inner surface are flexible is more flexible than metals forming the first outer surface and the second outer surface. Further, a meaning that metals forming the first outer surface and the second outer surface are rigid is more flexible than metals forming the first inner surface and the second inner surface. Here, according to the preferred embodiment of the present invention, flexibility and rigidity may be determined at a thickness of an alloy of stainless steel in that the first inner surface, the second inner surface, the first outer surface, and the second outer surface may be made of an alloy of the same stainless steel.

Figure 4:
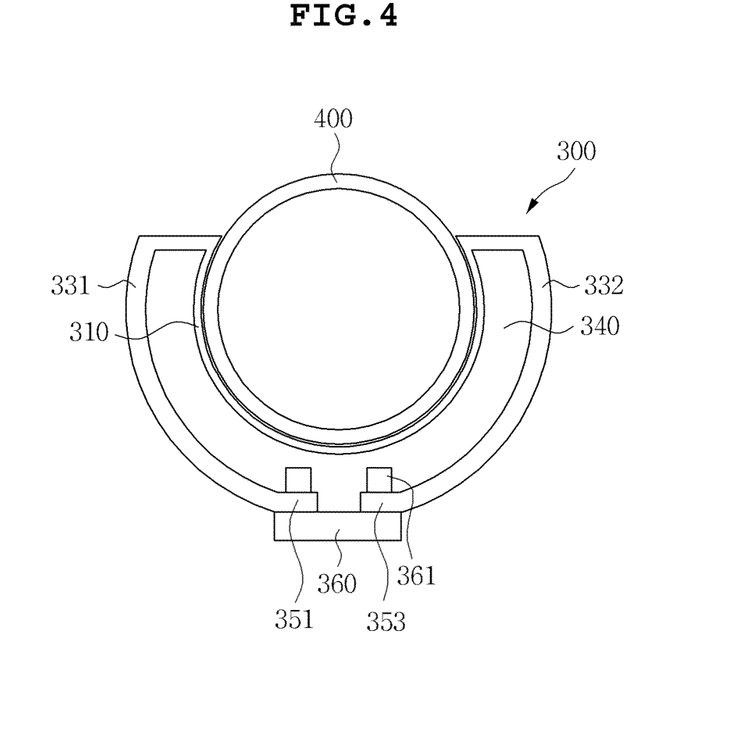
FIG. 4 is an exemplified diagram showing a fuel cell module according to another preferred embodiment of the present invention in which a fuel cell is mounted.

FIG. 4 is an exemplified diagram showing a fuel cell module according to another preferred embodiment of the present invention in which a fuel cell is mounted.

Referring to FIG. 4, a fuel cell module 300 may include an inner surface 310, a first outer surface 331, a second outer surface 332, an air passage 340, a first connection part 351, a second connection part 353, and a fixing part 360.

The inner surface 310 is formed to surround a fuel cell 400 by directly contacting the outer peripheral surface of the fuel cell 400. For example, the inner surface 310 may be formed to surround both sides and the lower portion of the fuel cell 400. The inner surface 310 may be formed in a curved surface so as to correspond to the outer peripheral surface of the fuel cell 400. Further, the inner surface 310 may be made of flexible metals. For example, the inner surface 310 may be made of thin stainless steel. That is, the inner surface 310 is made of stainless steel but may be thinly formed to have flexible properties. As such, the inner surface 310 is a curved surface corresponding to the fuel cell 400 and is made of flexible metals, such that the contact area of the fuel cell 400 is expanded as maximally as possible, thereby maximizing the current collector efficiency.

The first outer surface 331 may be formed to surround a portion of the inner surface 310 while being spaced apart from the first inner surface 310 at a predetermined distance. One side of the first outer surface 331 in a longitudinal direction may be connected to one side of the inner surface 310 in a longitudinal direction. The first outer surface 331 may be made of rigid metals. For example, the first outer surface 331 may be made of thick stainless steel. That is, the first outer surface 331 is made of stainless steel but may be thickly formed to have rigid properties. As such, the first outer surface 331 may be made of rigid metals to support the inner surface 310 on which the fuel cell 400 is mounted.

The second outer surface 332 may be formed to surround a portion of the inner surface 310 while being spaced apart from the first inner surface 310 at a predetermined distance. The other side of the second outer surface 332 in a longitudinal direction may be connected to the other side in a longitudinal direction of the inner surface 310. The second outer surface 332 may be made of rigid metals. For example, the second outer surface 332 may be made of thick stainless steel. That is, the second outer surface 332 is made of stainless steel but may be thickly formed to have rigid properties. As such, the second outer surface 332 may be made of rigid metals to support the inner surface 310 on which the fuel cell 400 is mounted.

The first connection part 351 may be longitudinally formed to the other side of the first outer surface 331. The first connection part 351 may be inserted with a control bar 361 of the fixing part 360.

The second connection part 353 may be longitudinally formed to the other side of the second outer surface 332. The second connection part 353 may be inserted with the control bar 361 of the fixing part 360.

The fixing part 360 is a member for fixing the first outer surface 331 and the second outer surface 332 so that the fuel cell 400 is mounted in the inner surface 310. The fixing part 360 may include the control bar 361. The control bar 361 may be a plurality of insertion parts protruded from one surface of the fixing part 360. The control bar 361 may be inserted in a form in which the first control bar 361 penetrates through the first connection part 351 and the second connection part 353. That is, the fixing part 360 fixes the first outer surface 331 and the second outer surface 332 by inserting the control bar 361 into the first connection part 351 and the second connection part 353, such that the inner surface 310 may be fixed at a predetermined width.

The air passage 340 is a space formed by the inner surface 310, the first outer surface 331 spaced apart from the inner surface 310 at a predetermined distance, and the second outer surface 332. The air to be supplied to the fuel cell 400 mounted in the fuel cell module 300 may pass through the air passage 340.

As described above, the fuel cell module 300 may be formed in a form in which the inner surface 310, the first outer surface 331, the second outer surface 332, and the fixing part 360 surround the fuel cell 400.

Figure 5:
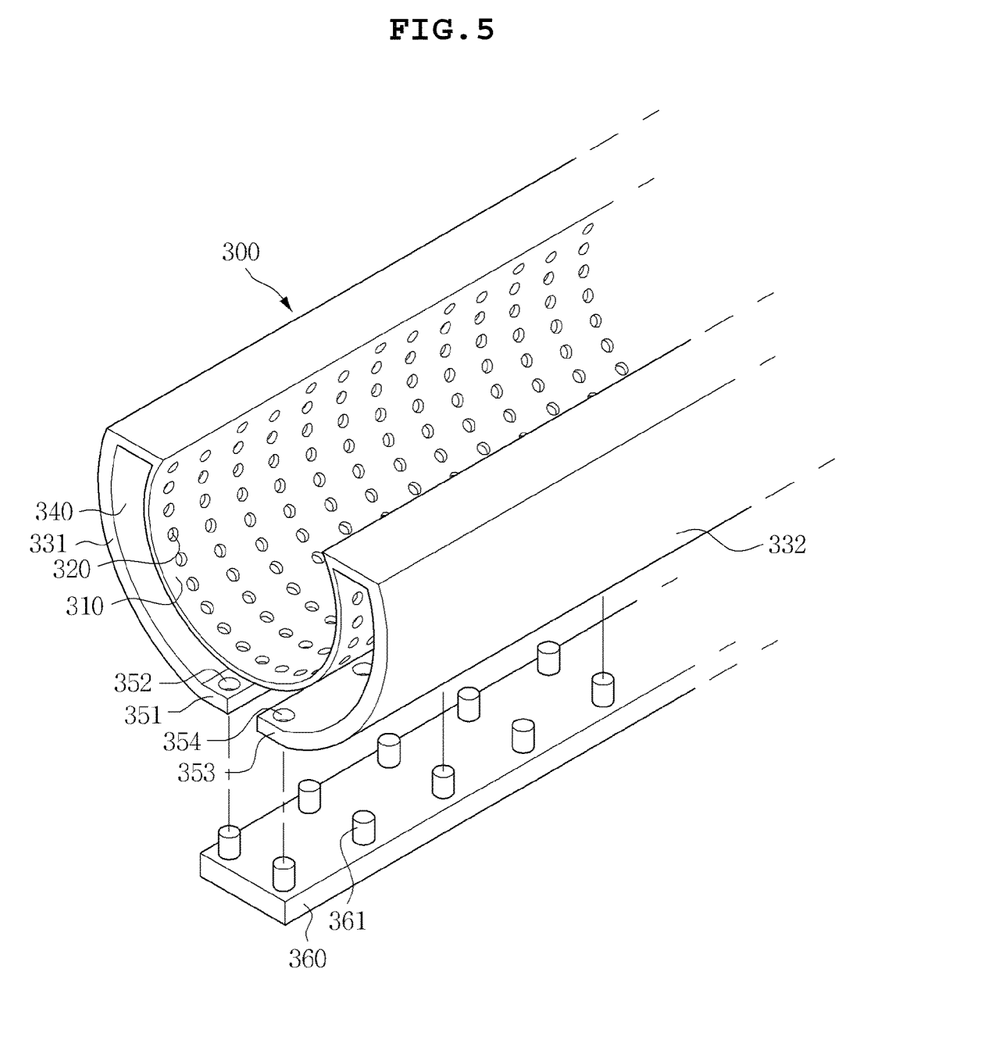
FIG. 5 is an exemplified diagram showing a fuel cell module according to another preferred embodiment of the present invention.

FIG. 5 is an exemplified diagram showing a fuel cell module according to another preferred embodiment of the present invention.

Referring to FIG. 5, the fuel cell module 300 may include the inner surface 310, the air supplying hole 320, the first outer surface 331, the second outer surface 332, the air passage 340, the first connection part 351, the second connection part 353, and the fixing part 360.

The inner surface 310 is formed to surround the fuel cell (not shown) by directly contacting the outer peripheral surface of the fuel cell (not shown). For example, the inner surface 310 may be formed to surround both sides and the lower portion of the fuel cell (not shown). The inner surface 310 may be formed in a curved surface so as to correspond to the outer peripheral surface of the fuel cell (not shown). Further, the inner surface 310 may be made of flexible metals. For example, the inner surface 310 may be made of thin stainless steel. That is, the inner surface 310 is made of stainless steel but may be thinly formed to have flexible properties. As such, the inner surface 310 is a curved surface corresponding to the fuel cell (not shown) and is made of flexible metals, such that the contact area of the fuel cell (not shown) is expanded as maximally as possible, thereby maximizing the current collector efficiency. In addition, the inner surface 310 may be formed with the air supplying hole 320 for supplying air to the fuel cell (not shown).

The first outer surface 331 may be formed to surround a portion of the inner surface 310 while being spaced apart from the first inner surface 310 at a predetermined distance. One side of the first outer surface 331 in a longitudinal direction may be connected to one side of the inner surface 310 in a longitudinal direction. The first outer surface 331 may be made of rigid metals. For example, the first outer surface 331 may be made of thick stainless steel. That is, the first outer surface 331 is made of stainless steel but may be thickly formed to have rigid properties. As such, the first outer surface 331 may be made of rigid metals to support the inner surface 310 on which the fuel cell (not shown) is mounted.

The second outer surface 332 may be formed to surround a portion of the inner surface 310 while being spaced apart from the first inner surface 310 at a predetermined distance. The other side of the second outer surface 332 in a longitudinal direction may be connected to the other side in a longitudinal direction of the inner surface 310. The second outer surface 332 may be made of rigid metals. For example, the second outer surface 332 may be made of thick stainless steel. That is, the second outer surface 332 is made of stainless steel but may be thickly formed to have rigid properties. As such, the second outer surface 332 may be made of rigid metals to support the inner surface 310 on which the fuel cell (not shown) is mounted.

The air passage 340 is a space formed by the inner surface 310, the first outer surface 331 spaced apart from the inner surface 310 at a predetermined distance, and the second outer surface 332. The air to be supplied to the fuel cell (not shown) mounted in the fuel cell module 300 may pass through the air passage 340.

The plurality of air supplying holes 320 may be formed in the inner surface 310. The air passage 340 may be connected to the inside of the fuel cell module (not shown), in which the fuel cell (not shown) is mounted, by the air supplying hole 320. That is, the air passing through the air passage 340 may be supplied to the fuel cell (not shown) mounted in the fuel cell module 110 by the air supplying hole 320.

The first connection part 351 may be longitudinally formed to the other side of the first outer surface 331. The first connection part 351 may be inserted with the first through hole 352 into which the control bar 361 of the fixing part 360 is inserted. The plurality of first through holes 352 may be formed in the first connection part 351.

The second connection part 353 may be longitudinally formed to the other side of the second outer surface 332. The second connection part 353 may be formed with the second through hole 354 into which the control bar 361 of the fixing part 360 is inserted. The plurality of second through holes 354 may be longitudinally formed to the second connection part 353.

The fixing part 360 is a member for fixing the first outer surface 331 and the second outer surface 332 so that the fuel cell (not shown) is mounted in the inner surface 310. The fixing part 360 may include the control bar 361. The control bar 361 may be a plurality of insertion parts protruded from one surface of the fixing part 360. Further, the plurality of control bars 361 having the protruded form may be formed to correspond to the first through hole 352 of the first connection part 351 and the second through hole 354 of the second connection part 353. The control bar 361 formed as described above may be inserted into the first through hole 352 formed in the first connection part 351 and the second through hole 354 formed in the second connection part.

The fixing part 360 may be fixed so that the inner surface 310 has a predetermined width by the control bar 361 formed as described above. For example, the fixing part 360 fixes the first outer surface 331 and the second outer surface 332 by inserting the control bar 361 into the first through hole 352 and the second through hole 354, such that the inner surface 310 may be fixed at a predetermined width.

Figure 6:
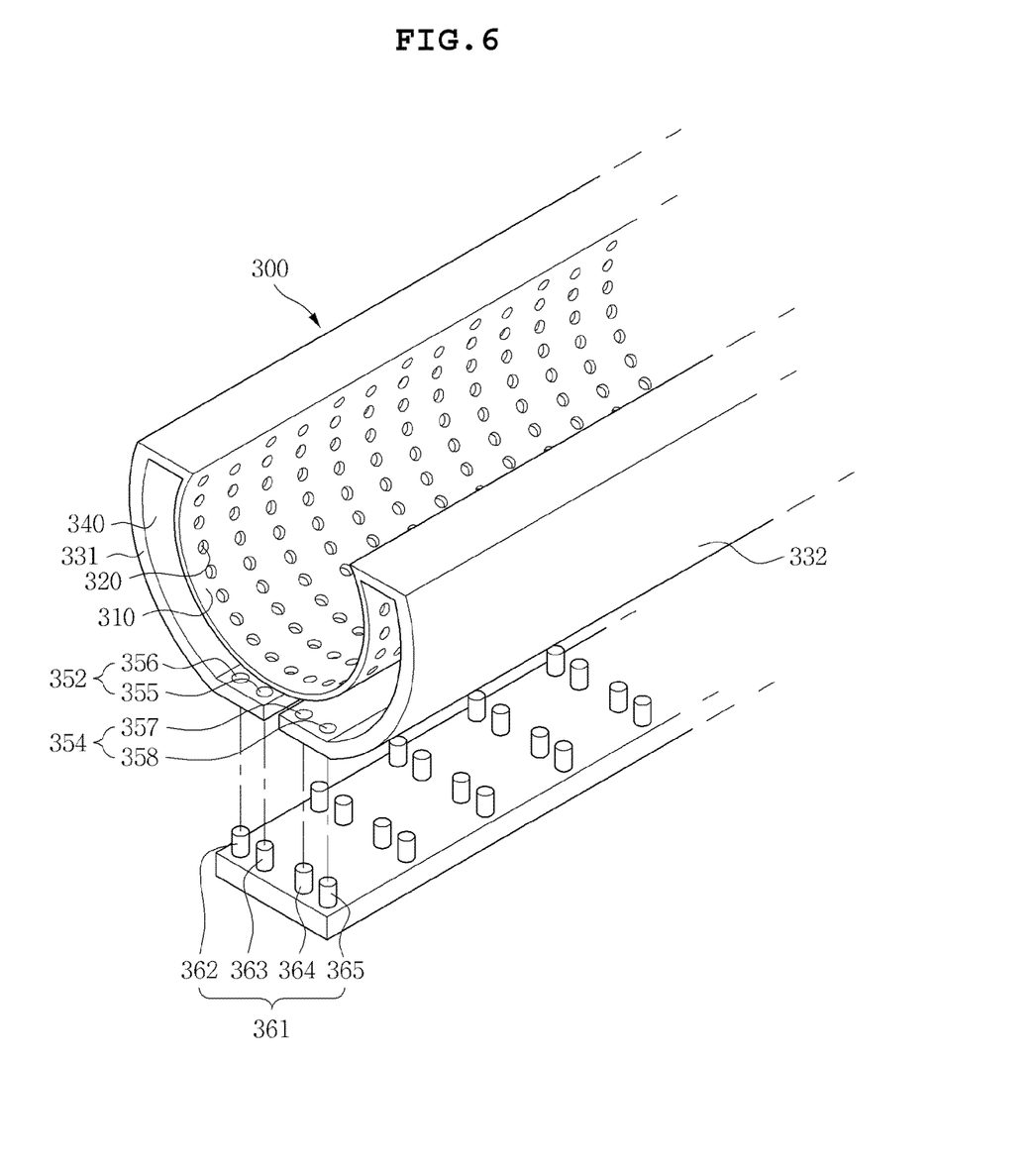
FIG. 6 is an exemplified diagram showing a fuel cell module according to another preferred embodiment of the present invention.

FIG. 6 is an exemplified diagram showing a fuel cell module according to another preferred embodiment of the present invention.

Referring to FIG. 6, the fuel cell module 300 may include the inner surface 310, the air supplying hole 320, the first outer surface 331, the second outer surface 332, the air passage 340, the first connection part 351, the second connection part 353, and the fixing part 360.

The inner surface 310 is formed to surround the fuel cell (not shown) by directly contacting the outer peripheral surface of the fuel cell (not shown). The inner surface 310 is made of stainless steel but may be thinly formed to have flexible properties. The first inner surface 310 may be formed with the air supplying hole 320 for supplying air to the fuel cell (not shown).

The first outer surface 331 may be formed to surround a portion of the inner surface 310 while being spaced apart from the first inner surface 310 at a predetermined distance. The first outer surface 331 is made of stainless steel but may be thickly formed to have rigid properties.

The second outer surface 332 may be formed to surround a portion of the inner surface 310 while being spaced apart from the first inner surface 310 at a predetermined distance. The second outer surface 332 is made of stainless steel but may be thickly formed to have rigid properties.

The first outer surface 331 and the second outer surface 332 formed as described above may be support the inner surface 310 on which the fuel cell (not shown) is mounted.

The air passage 340 is a space formed by the inner surface 310, the first outer surface 331 spaced apart from the inner surface 310 at a predetermined distance, and the second outer surface 332. The air to be supplied to the fuel cell (not shown) mounted in the fuel cell module 300 may pass through the air passage 340.

The plurality of air supplying holes 320 may be formed in the inner surface 310. The air passing through the air passage 340 may be supplied to the fuel cell (not shown) mounted in the fuel cell module 300 by the air supplying hole 320.

The first connection part 351 may be longitudinally formed to the other side of the first outer surface 331. The first connection part 351 may be inserted with the first through hole 352 into which the control bar 361 of the fixing part 360 is inserted. As shown in FIG. 6, the plurality of first through holes 352 may be formed by a plurality of columns of the first connection part 351 in a longitudinal direction. For example, the first through hole 352 may include a first inner through hole 355 and a first outer through hole 356.

The second connection part 353 may be longitudinally formed to the other side of the second outer surface 332. The second connection part 353 may be inserted with the second through hole 354 into which the control bar 361 of the fixing part 360 is inserted. As shown in FIG. 6, the plurality of second through holes 354 may be formed with a plurality of columns of the second connection part 353 in a longitudinal direction. For example, the second through hole 354 may include a second inner through hole 357 and a second outer through hole 358.

The fixing part 360 is a member for fixing the first outer surface 331 and the second outer surface 332 so that the fuel cell (not shown) is mounted in the inner surface 310. The fixing part 360 may include the control bar 361. The control bar 361 may be a plurality of insertion parts protruded from one surface of the fixing part 360. As shown in FIG. 6, the control bar 361 may also be formed with the plurality of columns. For example, the control bar 361 may include a first column control bar 362, a second column control bar 363, a third column control bar 364, and a fourth column control bar 365.

The fixing part 360 may be fixed so that the inner surface 310 may control the width of the inner surface 310 by the control bar 361 formed as described above. For example, the first column control bar 362 of the fixing part 360 is inserted into the first outer through hole 356 and when the fourth column control bar 365 is inserted into the second outer through hole 358, a diameter of the inner surface 310 may be minimized. In addition, the second column control bar 363 of the fixing part 360 is inserted into the first inner through hole 355 and when a third column control bar 364 is inserted into a second inner through hole 357, the diameter of the inner surface 310 may be maximized.

The number of first through holes 352 and second through holes 354 and the number of control bars 361 are not limited thereto and therefore, may be changed by those skilled in the art.

Figure 7:
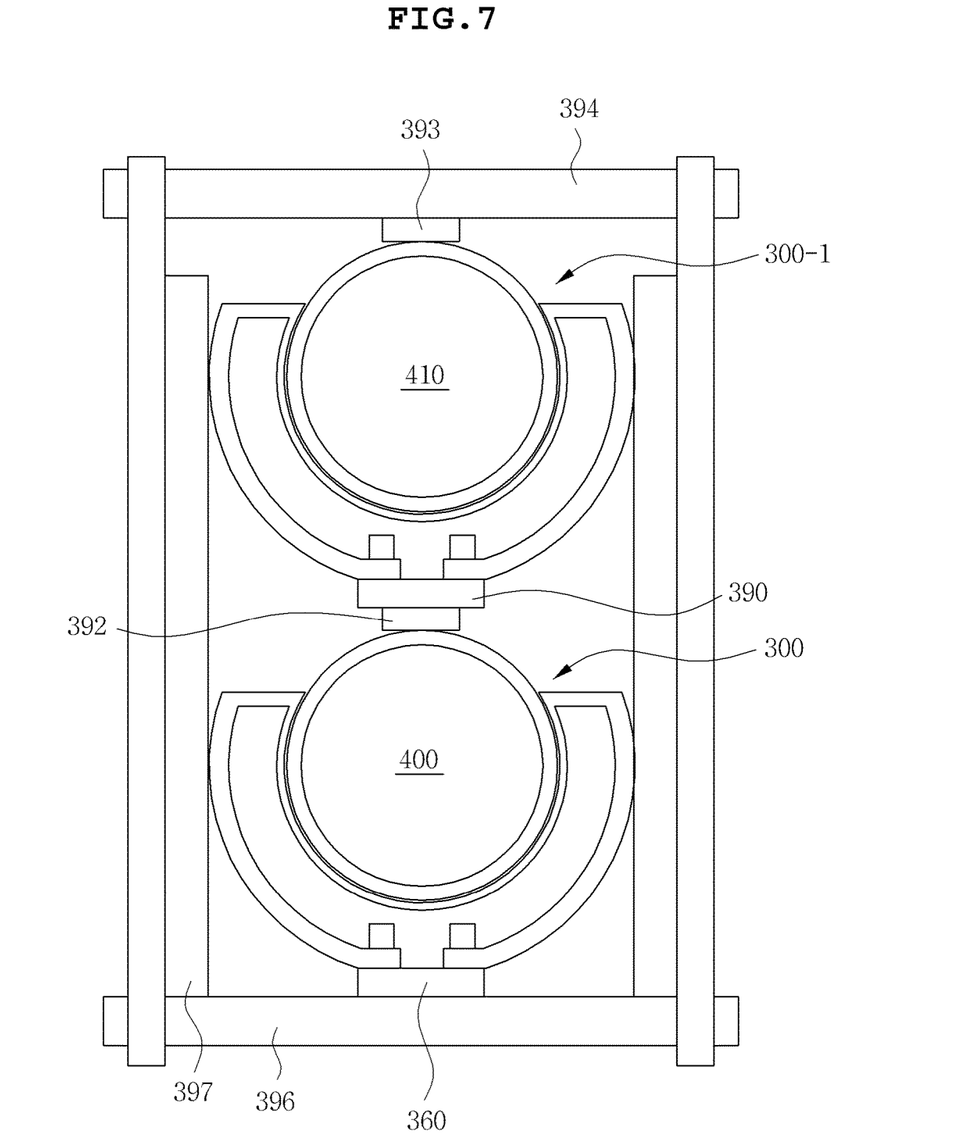
FIG. 7 is an exemplified diagram showing a multilayered fuel cell module according to another preferred embodiment of the present invention.

FIG. 7 is an exemplified diagram showing a multilayered fuel cell module according to another preferred embodiment of the present invention.

Referring to FIG. 7, a multilayered fuel cell module may be formed by stacking at least two fuel cell modules 300 and 300-1 in which fuel cells 400 and 410 are mounted.

Describing an example as shown in FIG. 7, the first fuel cell module 300, the second fuel cell module 300-1, the first fuel cell 400, the second fuel cell 410, the first connection member 392, the second connection member 393, the positive current collector plate 396, and the negative current collector plate 394, and an insulating plate 397 are stacked.

The first fuel cell module 300 is mounted with the first fuel cell 400. The lower portion of the outer peripheral surface of the first fuel cell module 300 may contact the positive current collector plate 396. That is, the first fixing part 360 of the first fuel cell module 300 may contact the positive current collector plate 396. Further, the inner surface of the first fuel cell module 300 may contact one side of the first fuel cell 400. Here, one side of the first fuel cell 400 may be a bottom surface.

The first fuel cell 400 is mounted in the first fuel cell module 300. The bottom surface of the first fuel cell 400 may contact the first fuel cell module 300. Further, a top surface of the first fuel cell 400 may contact the first connection member 392.

The first connection member 392 is a component for transferring the negative current generated from the first fuel cell 400 to the outside of the first fuel cell 400. The first connection member 392, which is a member for current collection of the first fuel cell 400, may be made of metals having electric conductivity. One side of the first connection member 392 is connected with the first fuel cell 400. That is, one side of the first connection member 392 may be formed so as to be electrically connected to an anode support (not shown) in the first fuel cell 400. In addition, the other side of the first connection member 392 may contact the lower portion of the outer peripheral surface of the second fuel cell module 300-1.

The second fuel cell module 300-1 is mounted with the second fuel cell 410. The lower portion of the outer peripheral surface of the second fuel cell module 300-1 may contact the first connection member 392. That is, the second fixing part 390 of the second fuel cell module 300-1 may contact the other side of the first connection member 392. The second fuel cell module 300-1 may be electrically connected with the first fuel cell 400 by contacting the first connection member 392. The inner surface of the second fuel cell module 300-1 may contact one side of the second fuel cell 410. Here, one side of the first fuel cell 400 may be a bottom surface.

The second fuel cell 410 is mounted in the second fuel cell module 300-1. The bottom surface of the second fuel cell 410 may contact the second fuel cell module 300-1. Further, the top surface of the second fuel cell 410 may contact the second connection member 393.

The second connection member 393 is a component for transferring the negative current generated from the second fuel cell 410 to the outside of the second fuel cell 410. The second connection member 393, which is a member for current collection of the second fuel cell 410, may be made of metals having electric conductivity. One side of the second connection member 393 is connected with the second fuel cell 410. That is, one side of the second connection member 393 may be formed so as to be electrically connected to an anode support (not shown) in the second fuel cell 410. In addition, the lower side of the second connection member 393 may contact the negative current collector plate 394.

The positive current collector plate 396 may collect positive current generated by the first fuel cell 400 and the second fuel cell 410.

The negative current collector plate 394 may collect negative current generated by the first fuel cell 400 and the second fuel cell 410.

The insulating plate 397 may be formed on both sides of the first fuel cell module 300 and the second fuel cell module 300-1. The insulating plate 397 is pressed to both sides of the first fuel cell module 300, such that the mounted first fuel cell 400 may better contact the first fuel cell module 300. In addition, the insulating plate 397 is pressed to both sides of the second fuel cell module 300-1, such that the mounted second fuel cell 410 may better contact the second fuel cell module 300-1.

As such, the first fuel cell 400 and the second fuel cell 410 may be disposed vertically by the first fuel cell module 300 and the second fuel cell module 300-1. Further, the first fuel cell module 300 and the second fuel cell module 300-1 may collect the positive current generated from the first fuel cell 400 and the second fuel cell 410 to the positive current collector plate 396 by serially connecting the first fuel cell 400 and the second fuel cell 410 that are vertically disposed.

The preferred embodiment of the present invention describes two fuel cell modules and two fuel cells, but is only an example. Therefore, the number of fuel cell modules and fuel cells is not limited thereto. The number of fuel cell modules and fuel cells may be changed by those skilled in the art.

In addition, the preferred embodiment of the present invention describes the case in which the plurality of fuel cells is connected to one another in series by vertically disposing the plurality of fuel cell modules but is only the example. The plurality of fuel cells may be connected to one another by horizontally disposing the plurality of fuel cell modules. In addition, the plurality of fuel cells may simultaneously be connected to one another in series and in parallel by vertically and horizontally connecting the plurality of fuel cell modules to one another.

In the preferred embodiment of the present invention, the inner surface is made of the flexible metals and the first outer surface and the second outer surface may be made of rigid metals, which may be expressed in relative terms. That is, a meaning that the metal forming the inner surface is flexible is more flexible than the metal forming the first outer surface and the second outer surface. In addition, a meaning that the metal forming the first outer surface and the second outer surface is rigid is more rigid than the metal forming the inner surface. Here, according to the preferred embodiments of the present invention, the flexibility and the rigidity may be determined at a thickness of an alloy of stainless steel in that the first inner surface and the second inner surface may be made of an alloy of the same stainless steel.

The fuel cell module according to the preferred embodiment of the present invention is formed to have a hinge structure to facilitate the insertion of the fuel cell. In addition, the inner surface of the fuel cell module according to the preferred embodiment of the present invention is made of the flexible metals, thereby expanding the contact area with the fuel cell as maximally as possible. In addition, the fuel cell module according to the preferred embodiment of the present invention can maximize the contact area with the fuel cell, thereby improving the current collector capacity. Further, the fuel cell module according to the preferred embodiment of the present invention can be made of an alloy of stainless steel to facilitate the oxidation-resistance coating later, thereby improving the durability. In addition, the fuel cell module according to the preferred embodiment of the present invention can be made of an alloy of stainless steel, thereby saving the manufacturing costs.

The fuel cell module according to the preferred embodiment of the present invention can be formed to have a hinge structure, thereby facilitating the insertion of the fuel cell.

The inner surface of the fuel cell module according to the preferred embodiment of the present invention can be made of the flexible metals, thereby expanding the contact area with the fuel cell as maximally as possible.

The fuel cell module according to the preferred embodiment of the present invention can maximize the contact area with the fuel cell, thereby improving the current collector capacity.

The fuel cell module according to the preferred embodiment of the present invention can be made of an alloy of stainless steel to facilitate the oxidation-resistance coating later, thereby improving the durability.

The fuel cell module according to the preferred embodiment of the present invention can be made of an alloy of stainless steel, thereby saving the manufacturing costs.

Although the embodiment of the present invention has been disclosed for illustrative purposes, it will be appreciated that a fuel cell module according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A fuel cell module, comprising:
   a first support part including a first body part surrounding one side of an outer peripheral surface of a fuel cell and a first connection part formed on one side of the first body part in a longitudinal direction;
   a second support part including a second body part surrounding the other side of the outer peripheral surface of the fuel cell and the second connection part formed on one side of the second body part in a longitudinal direction; and
   a fixing part passing through the first connection part and the second connection part to connect and fix the first connection part and the second connection part to each other.

2. The fuel cell module as set forth in claim 1, wherein the first body part includes:
   a first inner surface contacting and surrounding an outer peripheral surface of the fuel cell and including a first air supplying hole through which air passes; and
   a first outer surface spaced apart from the first inner surface at a predetermined distance so as to surround the first inner surface and connected with both sides of the first inner surface in a longitudinal direction,
   wherein a first air passage that is a space formed by being spaced apart from the first outer surface is connected with the first air supplying hole.

3. The fuel cell module as set forth in claim 2, wherein the first outer surface is formed to have rigidity stronger than that of the first inner surface.

4. The fuel cell module as set forth in claim 2, wherein the thickness of the first outer surface is formed to be thicker than that of the first inner surface.

5. The fuel cell module as set forth in claim 2, wherein the first inner surface and the first outer surface are made of an alloy of stainless steel.

6. The fuel cell module as set forth in claim 1, wherein the second body part includes:
   a second inner surface contacting and surrounding an outer peripheral surface of the fuel cell and including a second air supplying hole through which air passes; and
   a second outer surface spaced apart from the second inner surface at a predetermined distance so as to surround the second inner surface and connected with both sides of the second inner surface in a longitudinal direction,
   wherein a second air passage that is a space formed by being spaced apart from the second outer surface at a predetermined distance is connected with the second air supplying hole.

7. The fuel cell module as set forth in claim 6, wherein the second outer surface is formed to have rigidity stronger than that of the second inner surface.

8. The fuel cell module as set forth in claim 6, wherein the thickness of the second outer surface is formed to be thicker than that of the second inner surface.

9. The fuel cell module as set forth in claim 6, wherein the second inner surface and the second outer surface are made of an alloy of stainless steel.

10. The fuel cell module as set forth in claim 1, wherein the first connection part is protruded from one side of the first body part and provided with a plurality of first through holes formed in one side of the first body part in a longitudinal direction and having a form penetrating through a center thereof in the longitudinal direction.

11. The fuel cell module as set forth in claim 1, wherein the second connection part is protruded from one side of the second body part and provided with a plurality of second through holes formed in a longitudinal direction of one side of the second body part and having a form penetrating through a center thereof in the longitudinal direction.

12. A fuel cell module, comprising:
   an inner surface contacting and surrounding an outer peripheral surface of a fuel cell and including an air supplying hole through which air passes;
   a first outer surface surrounding a part of the inner surface while being spaced apart from the inner surface at a predetermined distance and having one side thereof connected with one side of the inner surface in a longitudinal direction;
   a second outer surface surrounding a part of the inner surface while being spaced apart from the inner surface at a predetermined distance and having the other side thereof connected with the other side of the inner surface in a longitudinal direction; and
   a fixing part inserted into the other side of the first outer surface and one side of the second outer surface.

13. The fuel cell module as set forth in claim 12, wherein the first outer surface and the second outer surface are formed to have rigidity stronger than the inner surface.

14. The fuel cell module as set forth in claim 12, wherein the thickness of the first outer surface and the second outer surface is formed to be thicker than that of the inner surface.

15. The fuel cell module as set forth in claim 12, wherein the first outer surface, the second outer surface, the inner surface, and the outer surface are made of an alloy of stainless steel.

16. The fuel cell module as set forth in claim 12, wherein the other side of the first outer surface and one side of the second outer surface are provided with a plurality of insertion holes formed in a longitudinal direction.

17. The fuel cell module as set forth in claim 16, wherein one surface of the fixing part is provided with a first control bar protruded corresponding to the insertion holes of the first outer surface and the second outer surface and inserted into the insertion holes.

18. The fuel cell module as set forth in claim 17, wherein one surface of the fixing part is provided with a second control bar protruded corresponding to the insertion holes of the first outer surface and the second outer surface and inserted into the insertion holes and formed so as to be spaced apart from the first control bar to the outside at a predetermined distance.

* * * * *